(12) United States Patent
Wu

(10) Patent No.: US 8,335,539 B1
(45) Date of Patent: Dec. 18, 2012

(54) CONTROLLING DEVICE FOR SHIFTING IMAGES IN A DISPLAY OF A SMARTPHONE

(76) Inventor: Chuan-Shih Wu, Changhua Hsien (TW)

(*) Notice: Subject to any disclaimer, the term of this patent is extended or adjusted under 35 U.S.C. 154(b) by 0 days.

(21) Appl. No.: 13/192,052

(22) Filed: Jul. 27, 2011

(30) Foreign Application Priority Data

Jul. 14, 2011 (TW) .............................. 100212897 U

(51) Int. Cl.
*H04B 1/38* (2006.01)

(52) U.S. Cl. ................... 455/557; 455/556.1; 455/556.2; 455/550.1; 348/207.99; 348/207.11

(58) Field of Classification Search .......... 455/557–559, 455/556, 425, 426.1–426.2, 41.1–41.3, 550.1, 455/556.1–556.2, 566, 158.4; 348/207.99, 348/207.11, 211.8; 345/156, 2.2
See application file for complete search history.

(56) References Cited

U.S. PATENT DOCUMENTS

| | | | |
|---|---|---|---|
| 2009/0006977 A1* | 1/2009 | Shim | 715/740 |
| 2010/0007678 A1* | 1/2010 | Tsai et al. | 345/660 |
| 2010/0255877 A1* | 10/2010 | Sarma | 455/557 |
| 2011/0151837 A1* | 6/2011 | Winbush, III | 455/412.1 |

* cited by examiner

*Primary Examiner* — Wayne Cai
(74) *Attorney, Agent, or Firm* — Jackson IPG PLLC

(57) ABSTRACT

A controlling device for shifting images in a display of a smartphone is provided with a monitor installed with a Screen Resident Device Driver. The Screen Resident Device Driver includes a Real Time Operating System that is in charge of a TCP/IP communication protocol, a USB-Host communication protocol, a Network and Display Server, a mobile phone and communication process driver, and a Bluetooth-Host communication protocol. The device further provides a mobile phone comprising a Mobile Phone Resident Device Driver installed in a mobile phone body. The Mobile Phone Resident Device Driver includes a Resident Detect Operation Service, a Remote Human Interface Device (HID), a Remote HID-Disk, a Display Resolution Control, a Remote Transaction Event Handler, and a Virtual Display Driver. Thereby, the image on the mobile phone is enlarged according to the geometric ratio so as to contribute to the virtual image.

8 Claims, 8 Drawing Sheets

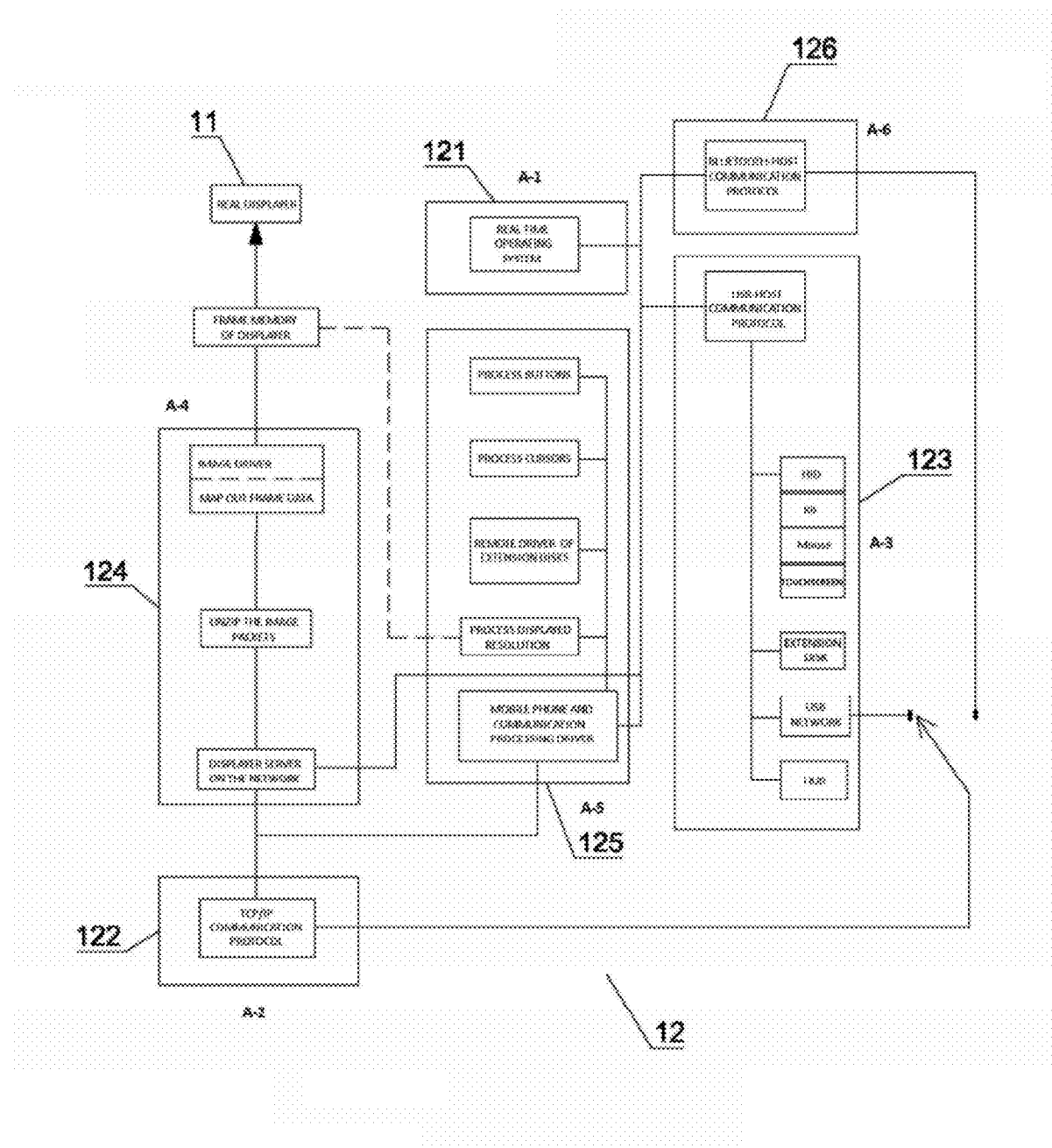
Fig. 1-A

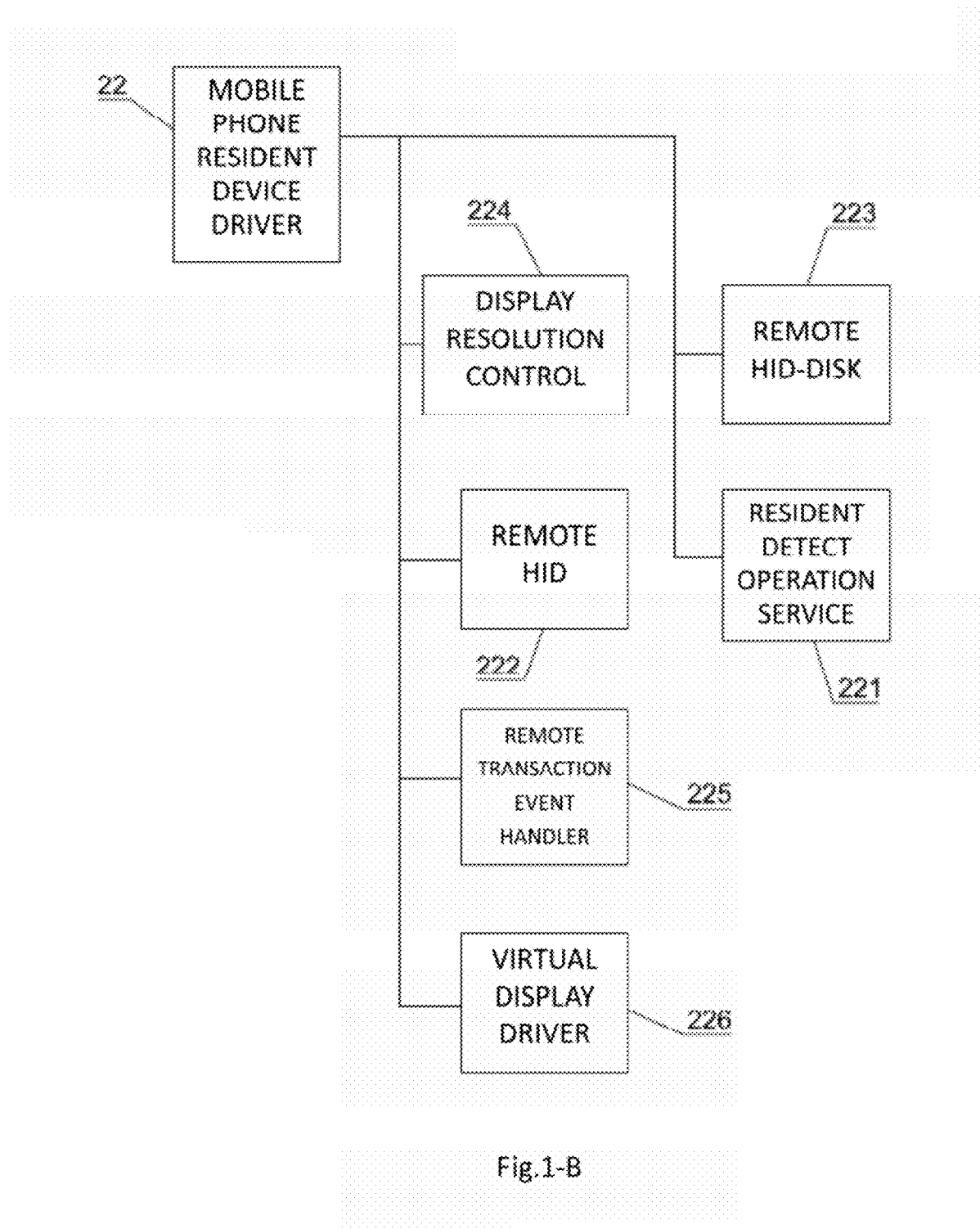
Fig.1-B

CONTROLLING DEVICE FOR SHIFTING IMAGES IN A DISPLAY OF A SMARTPHONE

BACKGROUND OF THE INVENTION

1. Field of the Invention

The present invention relates to a controlling device for shifting images in a display of a smartphone, which especially utilize a mobile phone to cooperate with a monitor that are both embedded with a resident device driver, respectively, thereby providing a mobile device available for multimedia.

2. Description of the Related Art

Today's smartphone generally comprises functions similar to that contained in a notebook or a PC. Other functions especially contained in the personal devices such as electronic books, digital cameras, or navigation devices are also gradually integrated in the smartphone. Not long ago, telecommunication operators merely provide voice service on the mobile phones, but today, they further provide value-added service on the mobile phones. There are also some mobile phone operators such as Microsoft, Google, Apple, and Blackberry are successively providing various operating systems like WP7 and Android. These operating systems let the notebook, the mobile phone, the TV, and other compatible devices be integrated and synchronically executed. Obviously, the smartphone is more than a mobile phone; the smartphone is a multi-functional mobile device that is necessary and essential in the daily life.

Considering the handiness, the smartphone would not be designed bulky (the biggest screen on the smartphone is 4.3 inches). Herein, this kind of small screen adversely results in difficult reading, especially when multimedia materials are displayed. Moreover, there is no physical button arranged on the smartphone; instead, users have to type with a predictive keyboard built in the smartphone, which in fact affects the speed of typing. Additionally, reacting force is particularly brought about while typing, which may hurt users' fingertips easily. Evidently, the design does not conform to the anthropometry, and the only fly in the ointment is the inconformity. Thus, the present invention is to conquer the insufficiency existing in the present smartphone.

There is a product in the market that is nearly satisfactory. However, the product only displays static document/images; the multimedia files are not available. Further, the appearance of the product is like a notebook; namely, it is heavy and not handy for portability. Therefore, a wireless transmission technology adopted in the present invention would be the Bluetooth and the Wireless Fidelity (Wi-Fi) that are able to ensure the dynamic video to be played properly. The screen of the present invention is structured like that of the Tablet PC in the market. Therefore, it is convenient to carry and it is suitable to play multimedia files.

SUMMARY OF THE INVENTION

1. The controlling device of the present invention is provided with a monitor installed with a Screen Resident Device Driver. The Screen Resident Device Driver includes a Real Time Operating System that is in charge of a TCP/IP communication protocol, the TCP/IP communication protocol that includes logic layers of network communication protocols, the USB-Host communication protocol that allows an input device of a Human Interface Device (HID) to wiredly communicate with the monitor and manages an allocation of a Hub. The Network and Display Server that manages a network, moves zipped virtual image packets on the mobile phone to the monitor for unzipping, copies and saves the unzipped packets via a Virtual Display Driver, and presents the unzipped packets as a real image on a displayer by enlarging a resolution required by the mobile phone under a geometric ratio. The Mobile Phone and Communication Processing Driver is able to synchronically transmit an action to the mobile phone via an extension input device on the monitor, download data of an extension driver, and data converted to an SD card. The mobile phone comprises a Mobile Phone Resident Device Driver installed in a mobile phone body. The Mobile Phone Resident Device Driver includes a Resident Detect Operation Service that confirms and detects the action from the input device; a Remote Human Interface Device (HID) that receives correlated indication from the HID on the monitor and synchronically displays the indication on a screen of the mobile phone; a Remote HID Disk that accesses and manages data from the disk while an action of plugging/unplugging of the disk is detected and confirmed; a Display Resolution Control that controls an action of increasing or fixing a resolution of the virtual image on the mobile phone proposed to be sent to on the monitor by either increasing or fixing the resolution, thereby allowing the virtual image to be properly sent to the monitor; a Remote Transaction Event Handler that receives the indication from the monitor for allowing the mobile phone to execute different functions or to synchronically execute different functions; a Virtual Display Driver that virtually enlarges the image proposed to be sent to the monitor in accordance with the geometric ratio, periodically zips partial virtual image or all virtual image, saves the zipped virtual image in a memory buffer, and timely sends the virtual image to the monitor via the Network and Display Server. Thereby, in view of the Screen Resident Device Driver built in the monitor and the Mobile Phone Resident Device Driver built in the mobile phone, the image on the mobile phone is enlarged according to the geometric ratio so as to contribute to the virtual image; while zipping either partial or all of the virtual image periodically, the zipped virtual image is saved in the memory buffer, so that the virtual image is wiredly sent to another monitor under a condition that the resolution is not changed or is increased; thereafter, the virtual image is further unzipped and enlarged into the real image for display; moreover, the mobile phone synchronically receives the indication from the monitor to execute correlated actions and concurrently display an identical image on the mobile phone and the monitor, serving to obtain a synchronized display and a synchronized receiving action for the controlling device to provide multiple functions. Further, the present invention can save cost and is convenient. Namely, when the present invention cooperates with any smartphone, it is sufficient for traveling or business, so users do not have to carry various mobile devices. Accordingly, when a single smartphone provides a variety of functions, other mobile devices are not needed anymore.

2. In the Screen Resident Device Driver, the USB-Host communication protocol is exchanged with the Bluetooth-Host communication protocol, facilitating a wireless transmission and communication as well as a convenience of control and portability.

BRIEF DESCRIPTION OF THE DRAWINGS

FIG. 1-A is a block chart showing the Screen Resident Device Driver of the present invention;

FIG. 1-B is a block chart showing the Mobile Phone Resident Device Driver of the present invention;

DETAILED DESCRIPTION OF THE PREFERRED EMBODIMENTS

Figure 1:
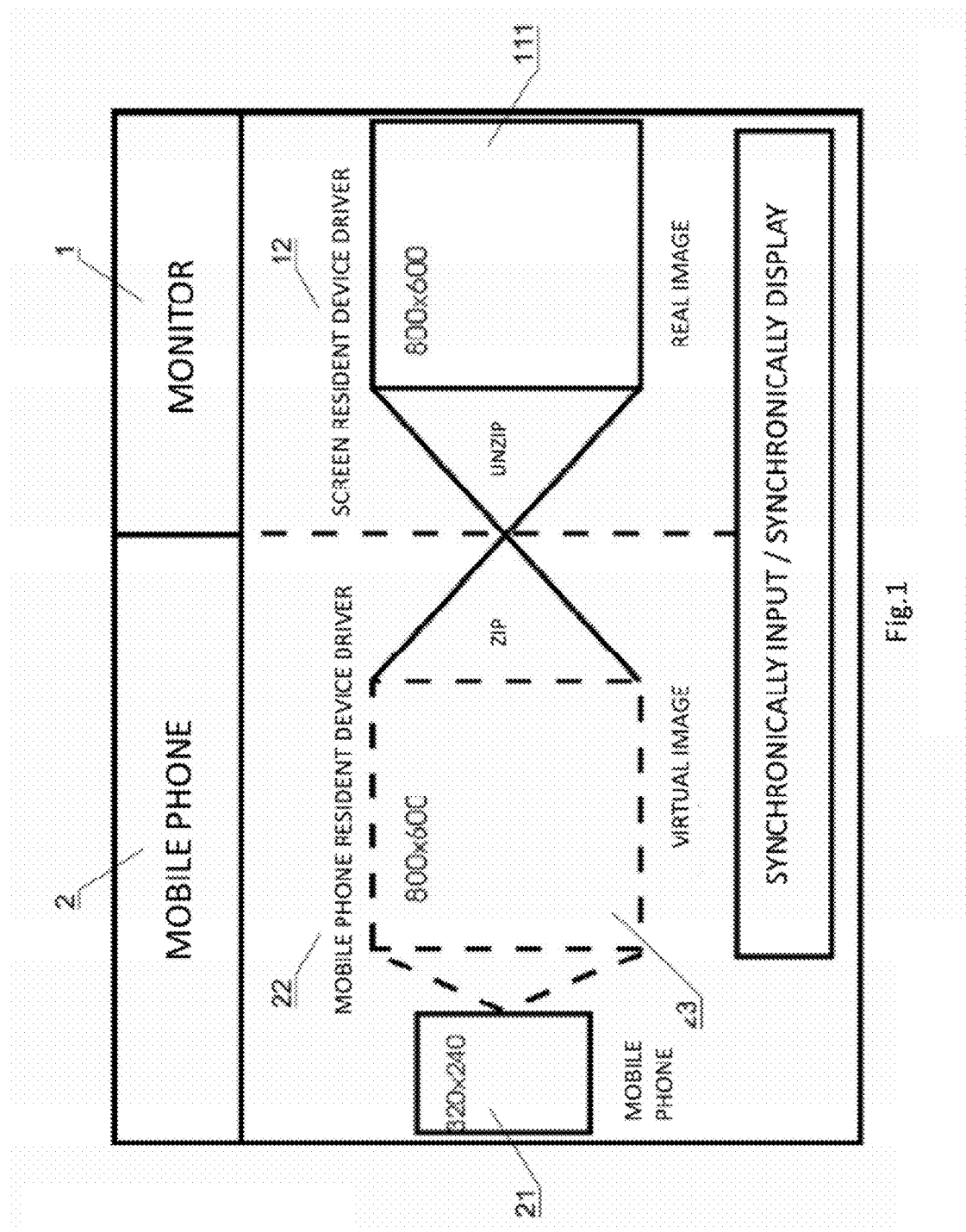
FIG. 1 is a schematic view showing the present invention.
Figure 2:
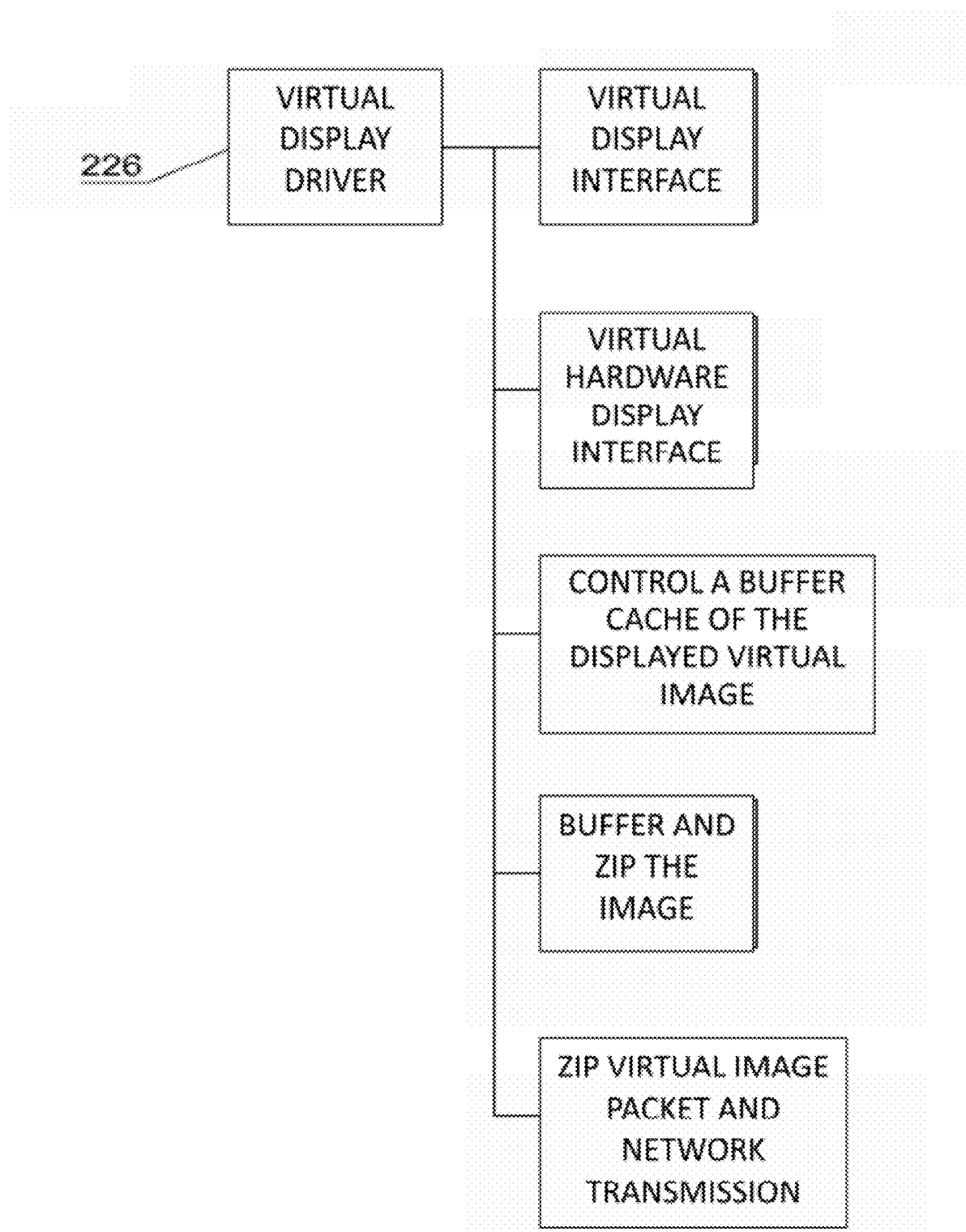
FIG. 2 is a block chart showing main functions of the Virtual Display Driver of the present invention.

Referring to FIGS. 1 to 2 and FIGS. 1-A to 1-B, the present invention is structured by a real-time firmware and a synchronic communication firmware installed in a monitor 1 and a mobile phone 2, respectively. The monitor 1 comprises a Screen Resident Device Driver 12 installed in the controlling device. The monitor 12 adopts an LCD monitor, a monitor of a micro-projector, or a monitor of an I-PAD or a notebook. The Screen Resident Device Driver 12 (as shown in FIG. 1-A) includes:

a Real Time Operating System 121 that is in charge of a TCP/IP communication protocol 122, a USB-Host communication protocol 123, a Bluetooth-Host communication protocol 126, a Network and Display Server 124, and a mobile phone and communication process driver 125 and controls a display time difference of frames between the mobile phone 2 and the monitor 1; a delay time is controlled within 5 microseconds;

the TCP/IP communication protocol 122 that includes 6 logic layers of network communication protocols; wherein, any unnecessary logic layers of network communication protocols of the TCP/IP communication protocol is deleted lest a memory thereof be occupied;

the USB-Host communication protocol 123 that allows an input device of a Human Interface Device (HID) to wiredly communicate with the monitor 1 and manages an allocation of a Hub; wherein, the input device of the HID of the USB-Host communication protocol adopts a keyboard, a mouse, a touchscreen, or an extension disk;

the Network and Display Server 124 that manages a network, moves zipped virtual image 23 packets on the mobile phone 2 to the monitor 1 for unzipping, copies and saves the unzipped packets via a Virtual Display Driver 226, and presents the unzipped packets as a real image 111 on a displayer 11 by enlarging a resolution required by the mobile phone 2 under a geometric ratio;

the Mobile Phone and Communication Processing Driver 125 that is able to synchronically transmit an action to the mobile phone 2 via an extension input device such as the keyboard or the mouse on the monitor 1; other download data of an extension driver, and data converted to an SD (Secure Digital) card from the monitor 1 are all able to be transmitted to the mobile phone 2;

a Bluetooth-Host communication protocol 126 that allows an input device of a Human Interface Device (HID) such as the keyboard, the mouse, the touchscreen, and the extension driver and the monitor 1 to wiredly communicate and manages an allocation of a Hub.

The mobile phone 2 comprises a Mobile Phone Resident Device Driver 22 installed in a mobile phone body. As shown in FIG. 1-B, the Mobile Phone Resident Device Driver 22 includes:

a Resident Detect Operation Service 221 that confirms and detects the action from the input device such as plugging/unplugging of the keyboard, the mouse, the touchscreen, and the extension driver;

a Remote Human Interface Device (HID) 222 that receives correlated indication from the HID such as the keyboard, the mouse, the touchscreen, and the extension driver on the monitor 1 and synchronically displays the indication on a screen 21 of the mobile phone 2;

a Remote HID Disk 223 that accesses and manages data from the disk while an action of plugging/unplugging of the disk is detected and confirmed;

a Display Resolution Control 224 that controls an action of increasing or fixing a resolution of the virtual image 23 on the mobile phone 2 proposed to be sent to the monitor 1;

a Remote Transaction Event Handler 225 that receives the indication from the monitor 1 for allowing the mobile phone to execute different functions or to synchronically execute different functions from the mobile phone 2 via touching the screen or pressing the buttons thereof;

a Virtual Display Driver 226 that virtually enlarges the image 21 proposed to be sent to the monitor 1 in accordance with the geometric ratio, periodically zips partial virtual image 23 or all virtual image 23, saves the zipped virtual image 23 in a memory buffer, and timely sends the virtual image 23 to the monitor 1 via the Network and Display Server 124; accordingly, images on both of the mobile phone 2 and the monitor 1 are synchronically displayed, and indications thereon are similarly received as well as executed.

Referring to FIGS. 1 and 3 to 6, a preferred embodiment of the present invention is shown. The mobile phone 2 adopts a smartphone of Win mobile and cooperates with the monitor 1 of an LCD type or a notebook type. The Screen Resident Device Driver 12 is installed in the screen control device, and the Mobile Phone Resident Device Driver 22 is installed in the mobile phone body. By the Mobile Phone Resident Device Driver 22 including the Resident Detect Operation Service 221, the Display Resolution Control 224, and the Virtual Display Driver 226, the mobile phone display 21 would be enlarged according to the ratio of equality into the virtual image 23. Whereby, the virtual image 23 would be partially zipped or entirely zipped for storing in the memory buffer regularly. Subsequently, the zipper virtual image 23 would be wiredly and timely transmitted to the displayer 11 for unzipping and enlarged into the real picture 111 via the Screen Resident Device Driver 12 including the Real Time Operating System 121, the TCP/IP communication protocol 122, the USB-Host communication protocol 123, the Network and Display Server 124, and the Mobile Phone and Communication Processing Driver 125. Accordingly, the monitor 1 can display any forms of files and play videos from the mobile phone 2. Preferably, the resolution could be properly fixed or increased as shown in FIG. 1, so that the displayed images are not distorted but rather fine. Further, by the Mobile Phone Resident Device Driver 22 including the Resident Detect Operation Service 221, the Remote HID, the Remote HID-Disk, and the Remote Transaction Event Handler 225 as well as by the Screen Resident Device Driver 12 including the Real Time Operating System 121, the TCP/IP communication protocol 122, the USB-Host communication protocol 123, and the Mobile Phone and Communication Processing Driver 125, the mobile phone 2 synchronically receives indications from the mobile phone 1 so as to execute the correlated action. As a result, the execution would be concurrently displayed on the displayer 11 of the mobile phone 2 and the monitor 1, respectively. When the present invention is assisted by the keyboard, the button, the mouse, the cursor, and the extension disk, and when the monitor 1 is installed by an extra touch device, the integral is structured like a Tablet PC. Thereby, the present invention is available for any mobile devices such as the navigation devices (PND)

the digital photo frames (DPF), the e-books, the notebooks, or the tablet PCs that require a monitor to play videos. Obviously, a single device is multi-function. Moreover, the images on the screen of the mobile phone could be freely shifted and mutually controlled.

Figure 3:
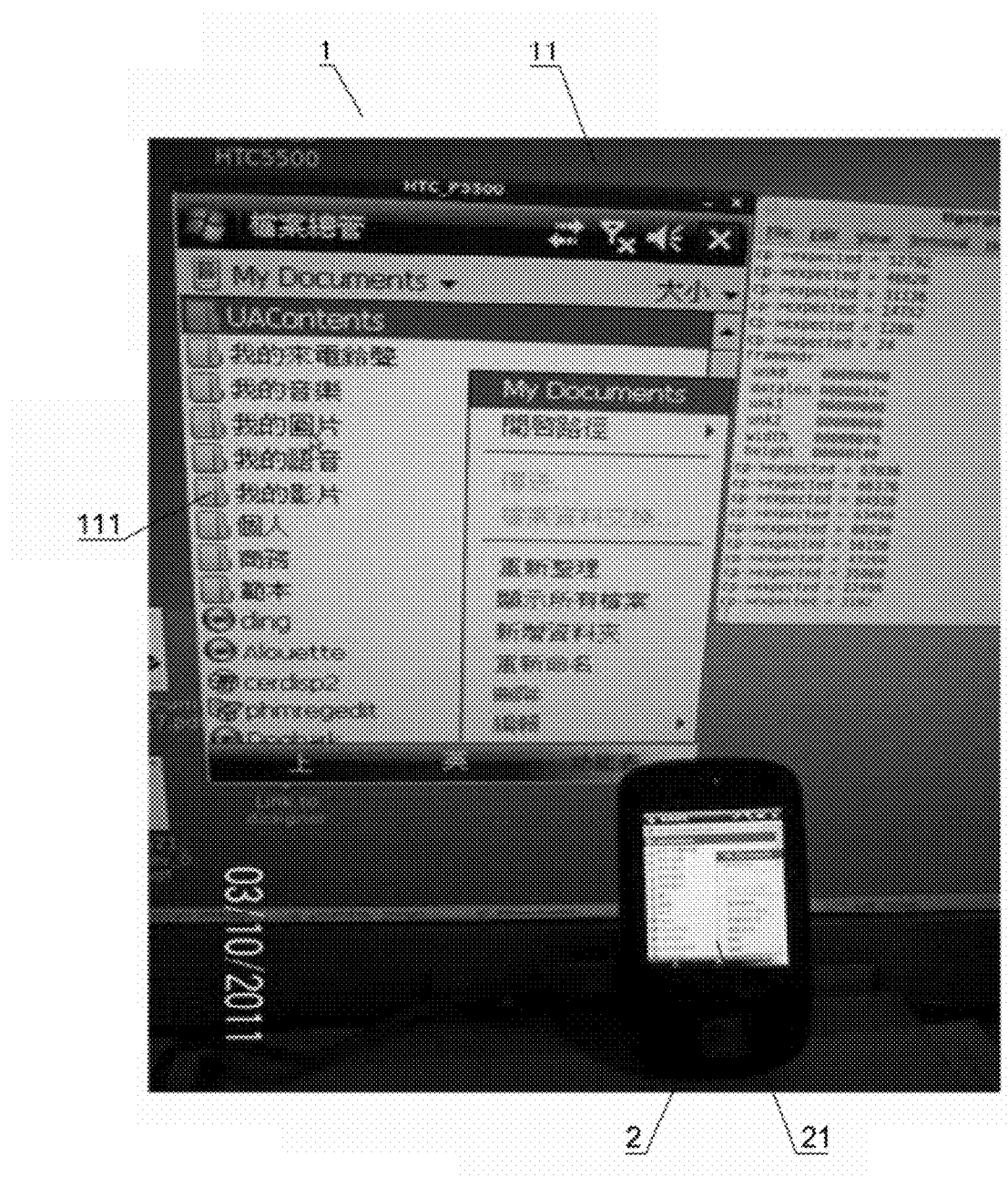
FIG. 3 is a schematic view showing the present invention being operated under the PC Linux operating system.

Referring to FIG. 3, the Win XP operating system is changed to the PC Linux operating system. Accordingly, the Network and Display Server 124 as well as the correlated Screen Resident Device Driver 12 should be designed compatible with both operating systems.

Figure 4:
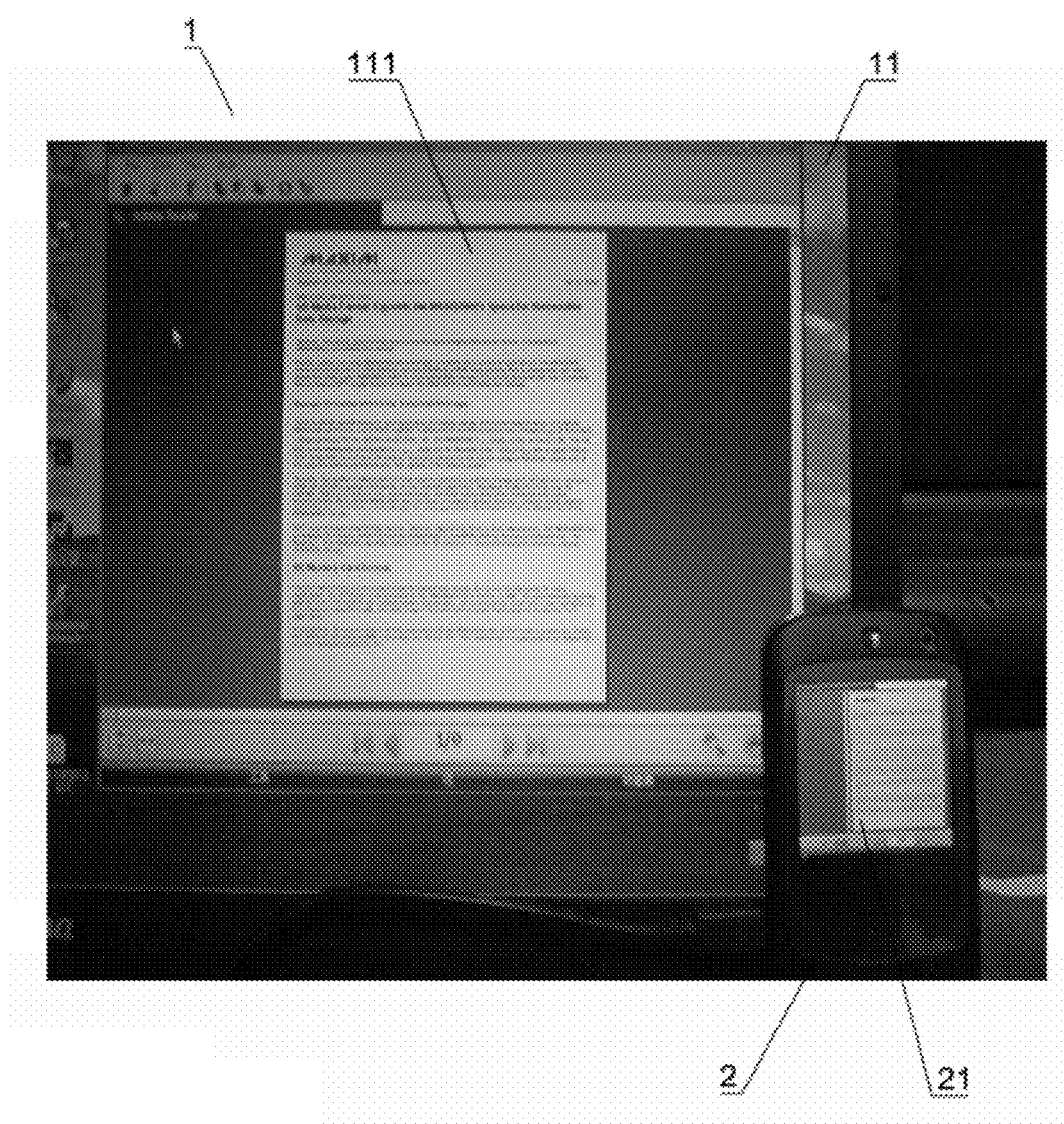
FIG. 4 is a schematic view showing the resolution of the present invention being enlarged.

Referring to FIG. 4, when the mobile phone is embedded by the Virtual Display Driver 226 via the Win Mobile operating system under the Win XP operating system, the resolution would be enlarged from 320×240 to 800×600 for conforming to the resolution for reading the electronic book.

Figure 5:
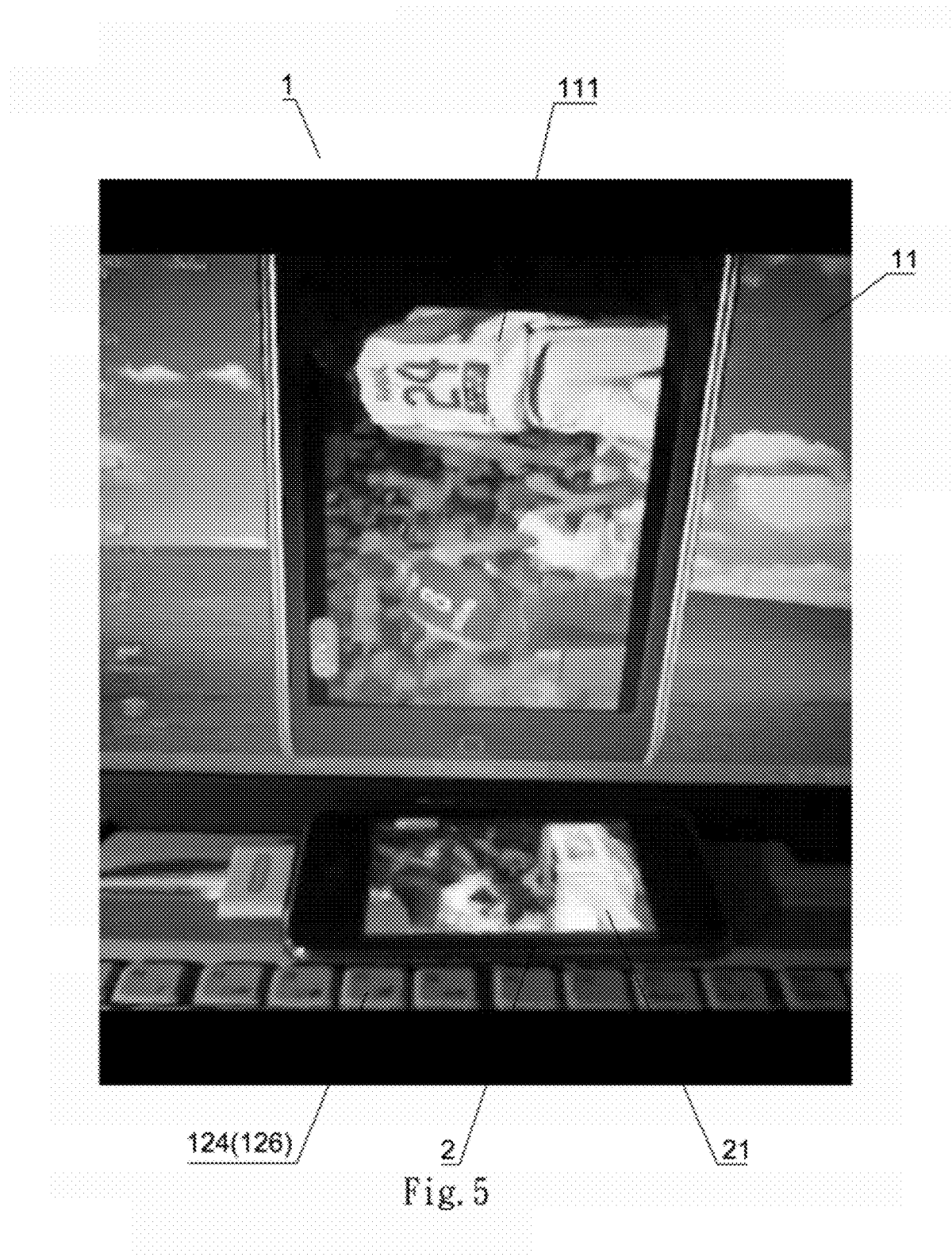
FIG. 5 is a schematic view showing the present invention wiredly transmitting videos.

Referring to FIG. 5, the test video is wiredly displayed.

In the Screen Resident Device Driver 12, the USB-Host communication protocol 123 is replaced by the Bluetooth-Host communication protocol 126, so that the wired transmission and communication is changed to wireless. Accordingly, a handier operation and a more convenient portability are achieved.

Figure 6:
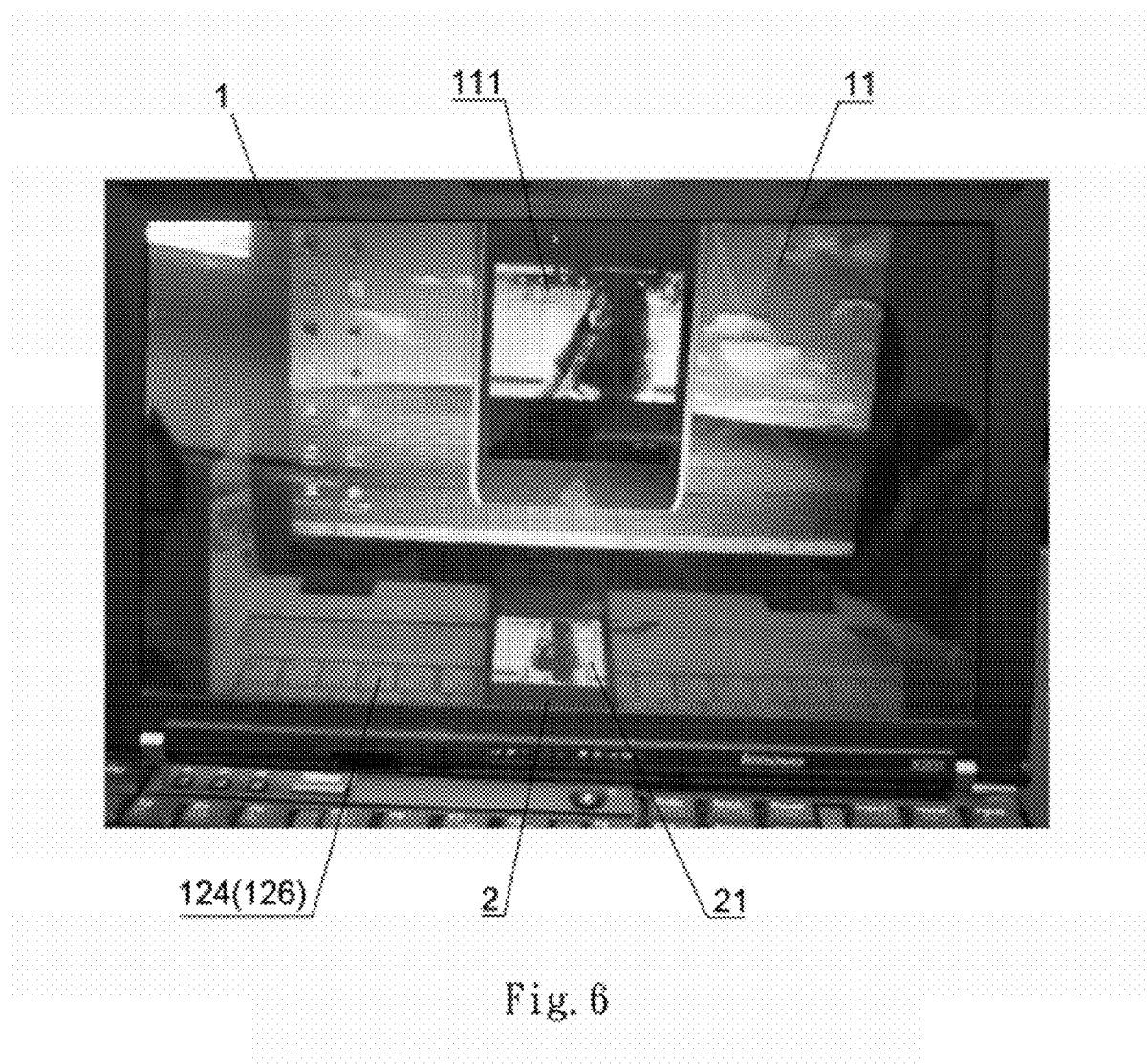
FIG. 6 is a schematic view showing the present invention wirelessly transmitting videos.

Referring to FIG. 6, the test video is displayed wirelessly.

Referring to FIG. 2, the Virtual Display Driver 226 mainly includes:

a function of virtual display interface providing functions that are unavailable in the original display interface and allowing the resolution to be dynamically switchable and a keyboard/video/mouse (KVM) to be switchable;

a function of a virtual hardware display interface converting a system for simulation hardware into a simulated display interface and allowing the virtual image 23 that is displayed to be drawn in a virtual display memory;

a function of a buffer cache of the displayed virtual image providing:

1. a mirroring mode periodically saving the images 21 on the mobile phone;

2. the virtual display mapping out a virtual frame for displaying in a main memory so as to demarcate a transmission memory buffer;

3. a remote monitor making a static image or a dynamic image as a compression source via a virtual frame memory or a main display memory;

a function of buffering and zipping the image 21 on the mobile phone by partially or entirely changing the zipping state, periodically; and a function of zipping virtual image packet network transmission for allowing the zipped image 21 on the mobile phone to be sent to a remote receiver through Internet.

I claim:

1. A controlling device for shifting images in a display of a smartphone being structured by a real-time firmware and a synchronic communication firmware installed in a monitor and a mobile phone, respectively; characterized in that, said monitor comprises a Screen Resident Device Driver installed in said controlling device; said Screen Resident Device Driver including:

a Real Time Operating System that is in charge of a Transmission Control Protocol/Internet Protocol (TCP/IP) communication protocol, a Universal Serial Bus Host (USB-Host) communication protocol, a Bluetooth-Host communication protocol, a Network and Display Server, and a mobile phone and communication process driver and controls a display time difference of frames between said mobile phone and said monitor; wherein said TCP/IP communication protocol that includes 4 logic layers of network communication protocols;

said USB-Host communication protocol that allows an input device of a Human Interface Device (HID) to wiredly communicate with said monitor and manages an allocation of a Hub;

said Network and Display Server that manages a network, moves zipped virtual image packets on said mobile phone to said monitor for unzipping, copies and saves said unzipped packets via a Virtual Display Driver, and presents said unzipped packets as a real image on a displayer by enlarging a resolution required by said mobile phone under a geometric ratio;

said Mobile Phone and Communication Processing Driver that is able to synchronically transmit an action to said mobile phone via an extension input device on said monitor, downloaded data of an extension driver, and data converted to an Secure Digital (SD) card;

said mobile phone comprising a Mobile Phone Resident Device Driver installed in a mobile phone body; said Mobile Phone Resident Device Driver including a Resident Detect Operation Service that confirms and detects said action from said input device;

a Remote Human Interface Device (HID) that receives correlated indication from said HID on said monitor and synchronically displays said indication on a screen of said mobile phone;

a Remote HID Disk that accesses and manages data from said disk while an action of plugging/unplugging of said disk is detected and confirmed;

a Display Resolution Control that controls an action of increasing or fixing a resolution of said virtual image on said mobile phone proposed to be sent to said monitor;

a Remote Transaction Event Handler that receives said indication from said monitor for allowing said mobile phone to execute different functions or to synchronically execute different functions;

a Virtual Display Driver that virtually enlarges said image proposed to be sent to said monitor in accordance with said geometric ratio, periodically zips partial virtual image or all virtual image, saves said zipped virtual image in a memory buffer, and timely sends said virtual image to said monitor via said Network and Display Server;

thereby, in view of said Screen Resident Device Driver built in said monitor and said Mobile Phone Resident Device Driver built in said mobile phone, said image on said mobile phone is enlarged according to said geometric ratio so as to contribute to said virtual image; while zipping either partial or all of said virtual image periodically, said zipped virtual image is saved in said memory buffer, so that said virtual image is wiredly sent to another monitor under a condition that said resolution is fixed or is increased; thereafter, said virtual image is further unzipped and enlarged into said real image for display; said mobile phone synchronically receives said indication from said monitor to execute correlated actions and concurrently display an identical image on said mobile phone and said monitor, serving to obtain a synchronized display and a synchronized receiving action for said controlling device to provide multiple functions.

2. The controlling device as claimed in claim 1, wherein, said monitor adopts an LCD monitor, a monitor of a micro-projector, or a monitor of an I-PAD or a notebook.

3. The controlling device as claimed in claim 1, wherein, said TCP/IP communication protocol includes 4 logic layers; any unnecessary logic layers is deleted lest a memory thereof be occupied.

4. The controlling device as claimed in claim 1, wherein, said input device of said HID of said USB-Host communication protocol adopts a keyboard, a mouse, a touchscreen, or an extension disk.

5. The controlling device as claimed in claim 1, wherein, said Resident Detect Operation Service detects said action of plugging/unplugging of a keyboard, a mouse, a touchscreen, or an extension disk.

6. The controlling device as claimed in claim 1, wherein, said HID of said Remote HID adopts a keyboard, a mouse, or a touchscreen to receive said indication from said HID on said monitor.

7. The controlling device as claimed in claim 1, wherein, said USB-Host communication protocol is exchanged with said Bluetooth-Host communication protocol, facilitating a wireless transmission and communication as well as a convenience of control and portability.

8. The controlling device as claimed in claim 1, wherein, said Virtual Display Driver mainly includes a function of a virtual display interface allowing said resolution and a plurality of display devices to be dynamically switchable; a function of a virtual hardware display interface converting a system for simulation hardware into a simulated display interface and allowing said virtual image that is displayed to be drawn in a virtual display memory; a function of a buffer cache of said displayed virtual image providing a mirroring mode, so that images on said mobile phone are periodically saved and providing a virtual display; wherein said virtual display mapping out a virtual frame for displaying in a main memory so as to demarcate a transmission memory buffer and providing a remote monitor, wherein said remote monitor making a static image or a dynamic image as a compression source via a virtual frame memory or a main display memory; a function of zipping buffer image for periodically changing images on said mobile phone to be partially zipped or entirely zipped; and a function of zipping virtual image packet network transmission for allowing said zipped image on said mobile phone to be sent to a remote receiver through Internet.

* * * * *